United States Patent
Oyama

(10) Patent No.: US 10,421,187 B2
(45) Date of Patent: Sep. 24, 2019

(54) ROBOT PROGRAM MODIFICATION DEVICE, ROBOT CONTROL DEVICE, ROBOT SIMULATION DEVICE, AND ROBOT PROGRAM MODIFICATION METHOD

(71) Applicant: FANUC CORPORATION, Yamanashi (JP)

(72) Inventor: Takumi Oyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/856,315

(22) Filed: Dec. 28, 2017

(65) Prior Publication Data

US 2018/0207801 A1 Jul. 26, 2018

(30) Foreign Application Priority Data

Jan. 26, 2017 (JP) ................................. 2017-012486

(51) Int. Cl.
  *B25J 19/06* (2006.01)
  *B25J 9/16* (2006.01)

(52) U.S. Cl.
  CPC ............ *B25J 9/1676* (2013.01); *B25J 19/06* (2013.01)

(58) Field of Classification Search
  CPC ...... B25J 9/1676; B25J 9/1674; B25J 9/1602; B25J 9/1664; B25J 19/06; G05B 19/4061;
  (Continued)

(56) References Cited

U.S. PATENT DOCUMENTS

2007/0021868 A1   1/2007   Nagatsuka et al.
2008/0188985 A1   8/2008   Sakano
(Continued)

FOREIGN PATENT DOCUMENTS

CN   105269583 A   1/2016
CN   105313120 A   2/2016
(Continued)

OTHER PUBLICATIONS

Japanese Decision to Grant a Patent dated Aug. 14, 2018, in connection with corresponding JP Application No. 2017-012486 (6 pgs., including English translation).
(Continued)

*Primary Examiner* — Dalena Tran
(74) *Attorney, Agent, or Firm* — Maier & Maier, PLLC

(57) ABSTRACT

A robot program modification device including a program storage unit that stores an operation program for a robot, a program execution unit that executes the stored operation program, a stop position estimation unit that estimates, at each operation position of the robot during execution of the operation program, a stop position of the robot in a case of cutoff of power, based on a movement speed of the robot, a stop position determination unit that determines whether the estimated stop position is in a predetermined region or not, and a speed modification unit that modifies, in a case where the stop position is determined to be outside the region, a set speed in the operation program such that a movement speed at the operation position corresponding to the stop position is reduced.

3 Claims, 4 Drawing Sheets

(58) Field of Classification Search
CPC .......... G05B 2219/43203; G05B 2219/50198;
G05B 19/0428; G05B 2219/39098; G05B
2219/43202; G05B 2219/49137
USPC ................ 700/255, 245, 250; 701/24; 901/1
See application file for complete search history.

(56) References Cited

U.S. PATENT DOCUMENTS

| | | | |
|---|---|---|---|
| 2008/0243306 A1* | 10/2008 | Koike | B23K 9/12 |
| | | | 700/250 |
| 2009/0091286 A1 | 4/2009 | Nihei et al. | |
| 2010/0292843 A1* | 11/2010 | Kariyazaki | B25J 9/1676 |
| | | | 700/264 |
| 2011/0046839 A1 | 2/2011 | Sato | |
| 2011/0087373 A1 | 4/2011 | Nagatsuka et al. | |
| 2011/0224826 A1 | 9/2011 | Maehara et al. | |
| 2014/0277724 A1* | 9/2014 | Suyama | B25J 9/1676 |
| | | | 700/255 |
| 2016/0008976 A1 | 1/2016 | Nagatsuka et al. | |
| 2016/0016313 A1 | 1/2016 | Oyama et al. | |
| 2016/0129589 A1 | 5/2016 | Liang et al. | |
| 2017/0190049 A1 | 7/2017 | Wada | |
| 2017/0232614 A1 | 8/2017 | Takeda | |

FOREIGN PATENT DOCUMENTS

| | | |
|---|---|---|
| CN | 105589407 A | 5/2016 |
| DE | 103 61 132 A1 | 1/2005 |
| DE | 10 2007 037 078 A1 | 2/2009 |
| EP | 1 752 847 A2 | 2/2007 |
| EP | 1 921 526 A1 | 5/2008 |
| EP | 1 955 831 A2 | 8/2008 |
| EP | 2047955 A2 | 4/2009 |
| EP | 2 366 504 A2 | 9/2011 |
| EP | 3 150 341 A1 | 4/2017 |
| EP | 3 360 655 A1 | 8/2018 |
| JP | 2003-136466 A | 5/2003 |
| JP | 2005-173909 A | 6/2005 |
| JP | 2007-054942 A | 3/2007 |
| JP | 2008-188722 A | 8/2008 |
| JP | 2009-090403 A | 4/2009 |
| JP | 2009-178842 A | 8/2009 |
| JP | 2011-037611 A | 2/2011 |
| JP | 2011-212831 A | 10/2011 |
| JP | 2015-226961 A | 12/2015 |
| JP | 2016-209991 A | 12/2016 |
| JP | 2017-144514 A* | 8/2017 |
| WO | 2008/031664 A1 | 3/2008 |
| WO | 2017/060989 A1 | 4/2017 |

OTHER PUBLICATIONS

Japanese Search Report dated Jul. 23, 2018, in connection with corresponding JP Application No. 2017-012486 (29 pgs., including English translation).

* cited by examiner

ROBOT PROGRAM MODIFICATION DEVICE, ROBOT CONTROL DEVICE, ROBOT SIMULATION DEVICE, AND ROBOT PROGRAM MODIFICATION METHOD

CROSS-REFERENCE TO RELATED APPLICATIONS

This application claims the benefit of Japanese Patent Application No. 2017-012486, the content of which is incorporated herein by reference.

TECHNICAL FIELD

The present invention relates to a robot program modification device, a robot control device, a robot simulation device, and a robot program modification method.

BACKGROUND ART

Conventionally, there is known a motion range setting device for calculating a stop position of a robot by taking into account a coasting distance calculated from the speed of the robot (for example, see Japanese Publication No. 2009-178842).

The motion range setting device disclosed in Japanese Publication No. 2009-178842 calculates a reach range of the reach of a robot by taking into account the coasting distance, and adjusts a motion range so that no interference is caused with peripheral equipments.

SUMMARY

An aspect of the present invention provides a robot program modification device including a program storage unit that stores an operation program for a robot, a program execution unit that executes the operation program stored in the program storage unit, a stop position estimation unit that estimates, at each operation position of the robot during execution of the operation program by the program execution unit, a stop position of the robot in a case of cutoff of power, based on a movement speed of the robot, a stop position determination unit that determines whether the stop position estimated by the stop position estimation unit is in a predetermined region or not, and a speed modification unit that modifies, in a case where the stop position is determined by the stop position determination unit to be outside the region, a set speed in the operation program such that a movement speed at the operation position corresponding to the stop position is reduced.

Moreover, another aspect of the present invention provides a robot program modification method including an execution step of executing an operation program for a robot created and stored in advance, a stop position estimation step of estimating, at each operation position of the robot during execution of the operation program in the execution step, a stop position of the robot in a case of cutoff of power, based on a movement speed of the robot, a stop position determination step of determining whether the stop position estimated in the stop position estimation step is in a predetermined region or not, and a speed modification step of modifying, in a case where the stop position is determined in the stop position determination step to be outside the region, a set speed in the operation program such that a movement speed at the operation position corresponding to the stop position is reduced.

DESCRIPTION OF EMBODIMENTS

A robot program modification device 2 and a robot control device 1 according to an embodiment of the present invention will be described below with reference to the drawings.

Figure 1:
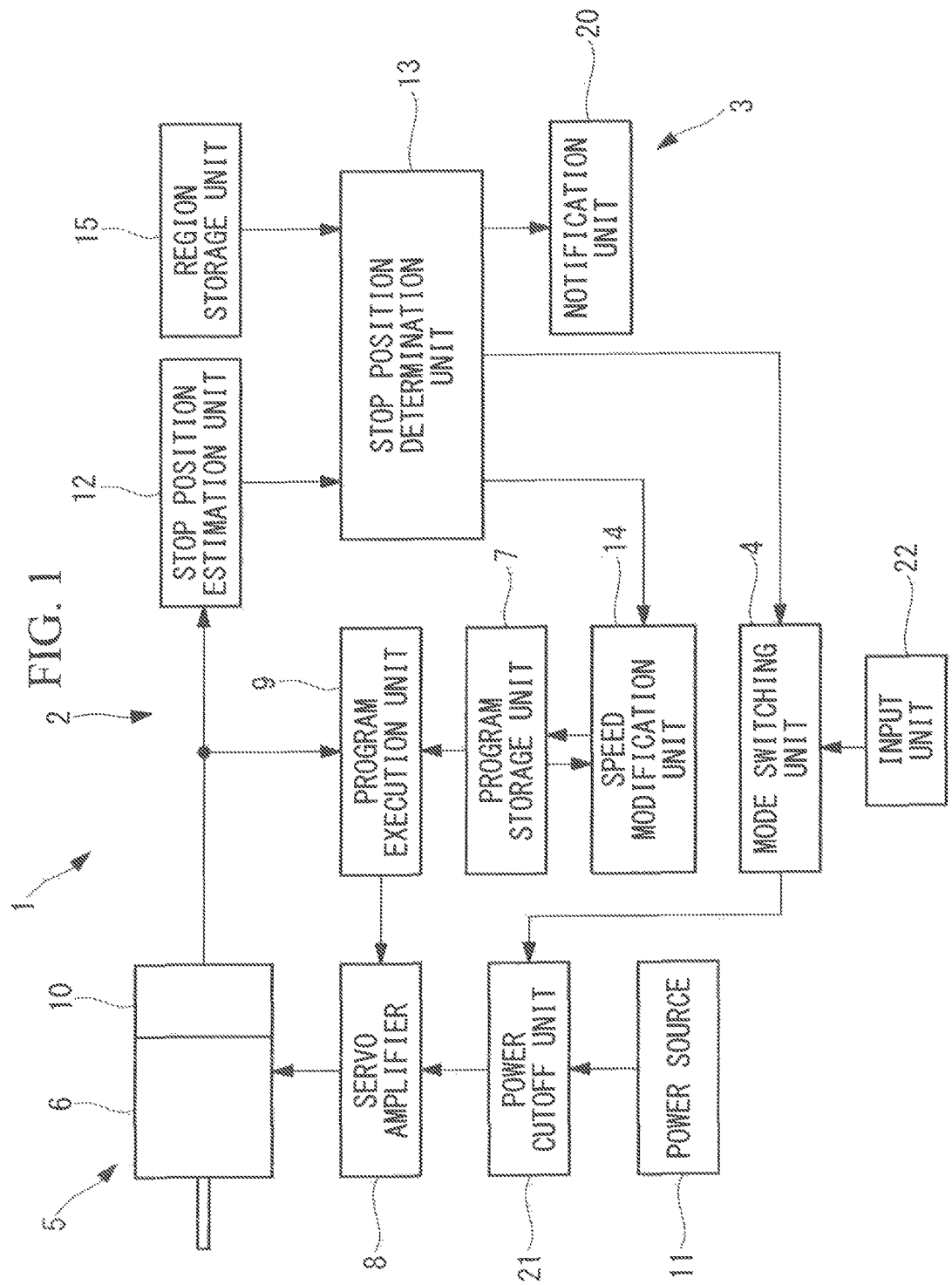
FIG. 1 is a block diagram showing a robot control device including a robot program modification device according to an embodiment of the present invention.

As shown in FIG. 1, the robot control device 1 according to the present embodiment includes the robot program modification device 2 according to the present embodiment, an alarm/stop unit 3, and a mode switching unit 4 capable of switching operation of the alarm/stop unit 3 to invalid. In FIG. 1, for the sake of simplicity of description, only a single motor is shown as each shaft motor 6 of a robot 5.

The robot program modification device 2 according to the present embodiment includes a program storage unit 7 that stores an operation program, a program execution unit 9 that executes the operation program stored in the program storage unit 7, and that generates a command signal for a servo amplifier 8 of each shaft motor 6 of the robot 5, a stop position estimation unit 12 that estimates a stop position at a time of cutoff of power from a power source 11 to the motor 6, based on position information output from an encoder 10 provided at the motor 6, a stop position determination unit 13 that determines whether the estimated stop position is in a predetermined region or not, and a speed modification unit 14 that modifies a set speed described in the operation program when the estimated stop position is determined to be outside the predetermined region. In the drawing, the reference sign 15 is a region storage unit that stores information about the predetermined region, which is connected to the stop position determination unit 13.

Figure 2:
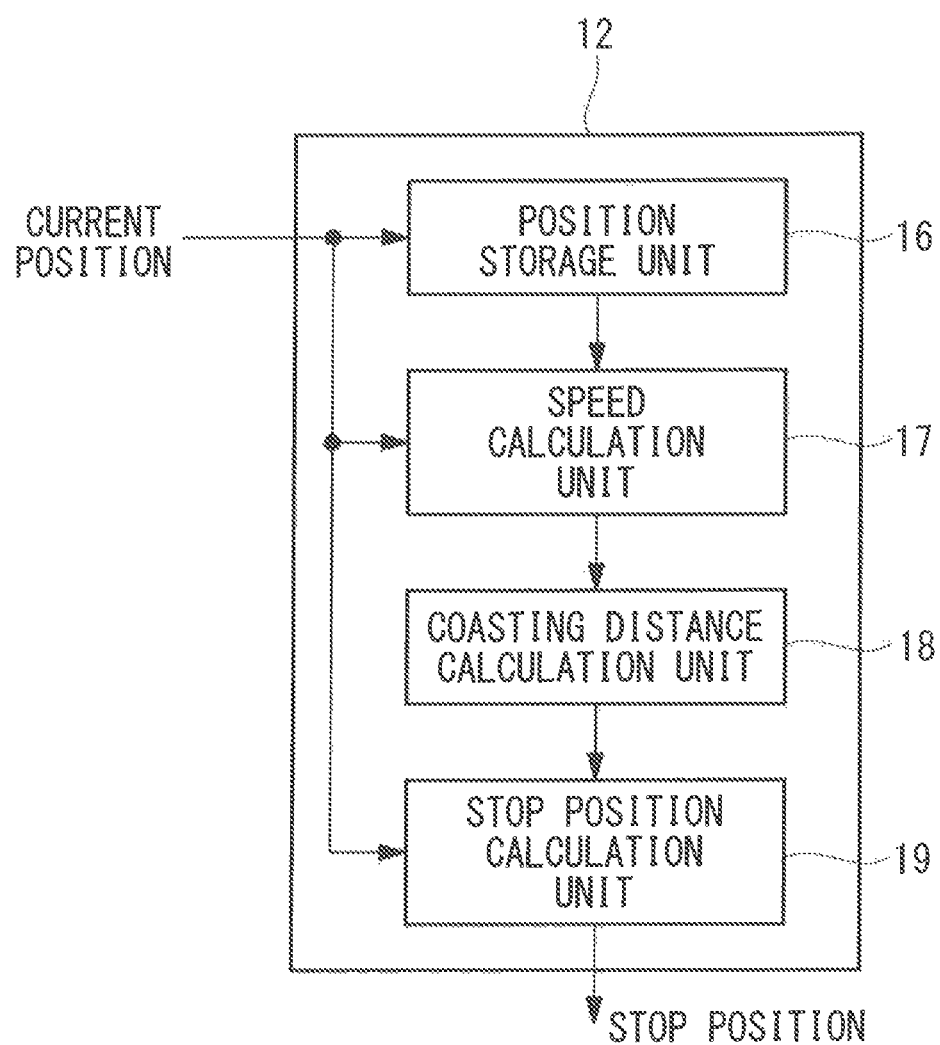
FIG. 2 is a block diagram showing details of a stop position estimation unit provided in the robot program modification device in FIG. 1.

As shown in FIG. 2, the stop position estimation unit 12 includes a position storage unit 16 that stores position information of one control cycle before, a speed calculation unit 17 that calculates a current movement speed by dividing, by a control cycle, a difference between a current position of the motor 6 detected by the encoder 10 and a position, stored in the position storage unit 16, of the motor 6 one control cycle before, a coasting distance calculation unit 18 that calculates a coasting distance based on the current movement speed, and a stop position calculation unit 19 that calculates a stop position based on the current position and the coasting distance.

The coasting distance calculation unit 18, for example, includes a map (not shown) storing a coasting distance in association with a movement speed of the robot 5, and outputs a coasting distance retrieved from the map every time a movement speed calculated by the speed calculation unit 17 is input. Additionally, the coasting distance is different depending on the weight of a tool or the like attached to the robot 5, and thus, the weight of a tool or the like and a movement speed may be stored in advance in the map in association with each other, and a search through the map may be performed by having the weight of a tool or the like input and based on the input weight of a tool or the like and the calculated movement speed.

The stop position determination unit 13 compares a stop position calculated by the stop position calculation unit 19 and the information about the predetermined region stored in the region storage unit 15, and determines whether the stop position is within the predetermined region or not. Moreover, in the case of determining that the stop position is outside the predetermined region, the stop position determination unit 13 performs an output to the effect to the alarm/stop unit 3 and the speed modification unit 14.

The alarm/stop unit 3 includes a notification unit 20 that issues an alarm to the effect that the stop position is determined by the stop position determination unit 13 to be outside the predetermined region, and a power cutoff unit 21 that cuts off supply of power from the power source 11 to the servo amplifier 8.

The mode switching unit 4 is a switch which allows an operator to manually turn on or off a signal from the stop position determination unit 13 to the power cutoff unit 21 by use of an input unit 22. When the mode switching unit 4 is manually switched to an off state by an operator, cutoff of power by the power cutoff unit 21 is not performed even if an output is performed by the stop position determination unit 13 to the effect that the stop position is determined to be outside the predetermined region.

The speed modification unit 14 modifies the operation program specifying the movement speed at an operation position of the robot 5 whose stop position has been determined by the stop position determination unit 13 to be outside the predetermined region, such that a set speed at a teaching point in the operation program is reduced.

Specifically, the operation program mainly sets coordinate positions of a plurality of teaching points, and a set speed which is a movement speed at the time of moving the robot 5 from a teaching point to a next teaching point, and the movement speed at each operation position between a first teaching point and a second teaching point is determined by the set speed set for the second teaching point. Accordingly, in the case where the stop position is determined to be outside the predetermined region at any of the operation positions between the first teaching point and the second teaching point, the speed modification unit 14 reduces the set speed set for the second teaching point. The amount of reduction in the set speed at the speed modification unit 14 may be set to an appropriate value in advance.

A description is given below regarding a robot program modification method which uses the robot program modification device 2 and the robot control device 1 according to the present embodiment configured in the above manner.

Figure 3:
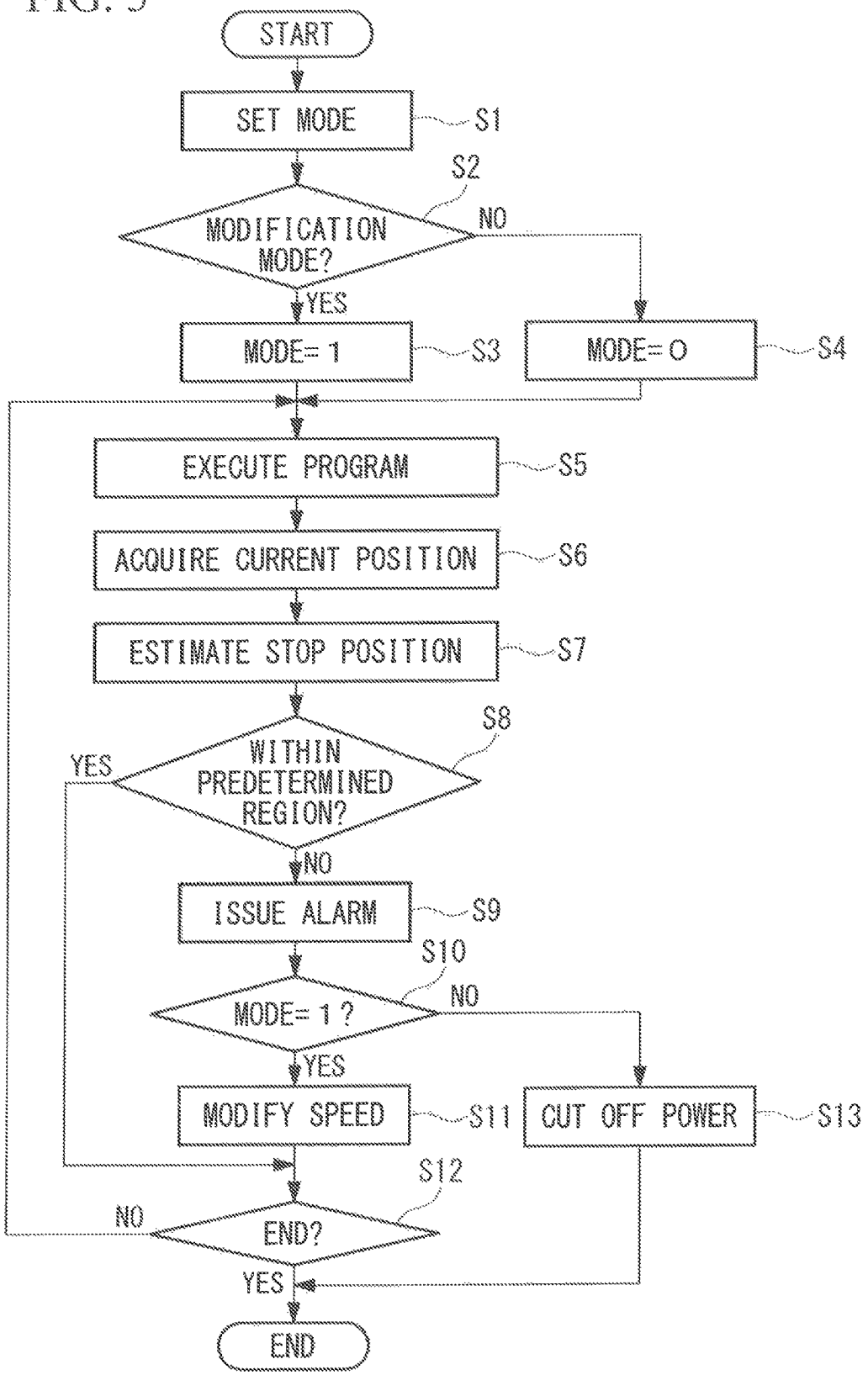
FIG. 3 is a flowchart describing a robot program modification method, of the robot control device in FIG. 1, according to an embodiment of the present invention.

As shown in FIG. 3, to modify the operation program for the robot 5, an operator operates the mode switching unit 4 using the input unit 22, and sets to an operation program modification mode (step S1).

For example, in the case where an operation mode is set to the modification mode, a coefficient MODE=1 is set (steps S2, S3), and in the case where the operation mode is not the modification mode, a coefficient MODE=0 is set (steps S2, S4).

By executing, in this state, the operation program stored in the program storage unit 7 by the program execution unit 9 (execution step S5), current position information is acquired from the encoder 10 of the motor 6 at a predetermined control cycle (step S6). A current movement speed is calculated from the current position information and position information of one control cycle before, which is stored in the position storage unit 16, and the coasting distance is calculated, and the stop position is estimated from the current position information and the coasting distance (stop position estimation step S7).

Whether the estimated stop position is in the predetermined region stored in the region storage unit 15 is determined (stop position determination step S8), and in the case where the estimated stop position is in the predetermined region, step S12 is performed. In the case where the stop position is outside the predetermined region, an alarm is issued by the notification unit 20 (step S9), and if the mode is the modification mode (step S10), the operation program is modified to reduce the set speed (speed modification step S11). In the case of continuing execution of the operation program, steps are repeated from the execution step S5 (step S12).

In the case where the mode is not the modification mode (step S10), the power cutoff unit 21 is operated and power to the servo amplifier 8 is cut off (step S13), and the robot 5 is caused to make an emergency stop.

As described above, with the robot program modification device 2, the robot control device 1, and the robot program modification method according to the present embodiment, when the stop position estimated by the stop position estimation unit 12 from the current position and the movement speed is determined by the stop position determination unit 13 to be outside the predetermined region, the operation program is modified to reduce the speed at the operation position, and thus, the possibility of an alarm to the effect that the stop position will be outside the predetermined region being issued next time for the same operation position may be reduced.

In this case, according to the present embodiment, the set speed at a teaching point where the speed for the operation position for which the stop position is determined to be outside the predetermined region is set is reduced instead of modifying the coordinate position of each teaching point in the operation program for the robot 5, and thus, there is an advantage that interference with peripheral equipments may be avoided without changing the motion range taught by the operator.

For example, in a case where the operator sets, as a predetermined region, a teaching point next to a safety fence, if, at the set speed set by the operation program, the power is to be cut off near the teaching point and the robot 5 is to come into contact with the safety fence due to coasting, the movement speed of the robot 5 near the teaching point may be reduced by the robot program modification device 2 and the robot program modification method according to the present embodiment, and the robot 5 may be prevented from coming into contact with the safety fence even when the power is cut off and coasting occurs. At this time, the coordinate position of the teaching point is not changed, and the robot 5 may be caused to move according to the teaching point taught by the operator.

Additionally, the amount of reduction in the movement speed by the speed modification unit 14 is not particularly specified, but when a large amount of reduction is set, a set speed at which alarm/stoppage are not caused may be swiftly set, and when a small amount of reduction is set, the maximum set speed at which alarm/stoppage are not caused may be set by executing the operation program one or more times. Even if a set speed at which alarm/stoppage are not caused is not set by executing the operation program once, the operation program may be repeatedly executed to set the maximum set speed at which alarm/stoppage are not caused.

Furthermore, in the present embodiment, the mode switching unit 4 is set such that cutoff of power by the power cutoff unit 21 is invalidated at the time of execution of the operation program for modification of the operation program, but the mode switching unit 4 does not have to be provided. In this case, power is cut off and emergency stop is made every time an estimated stop position is determined to be outside the predetermined region, and modification may be performed at that time point such that the movement speed is reduced.

Figure 4:
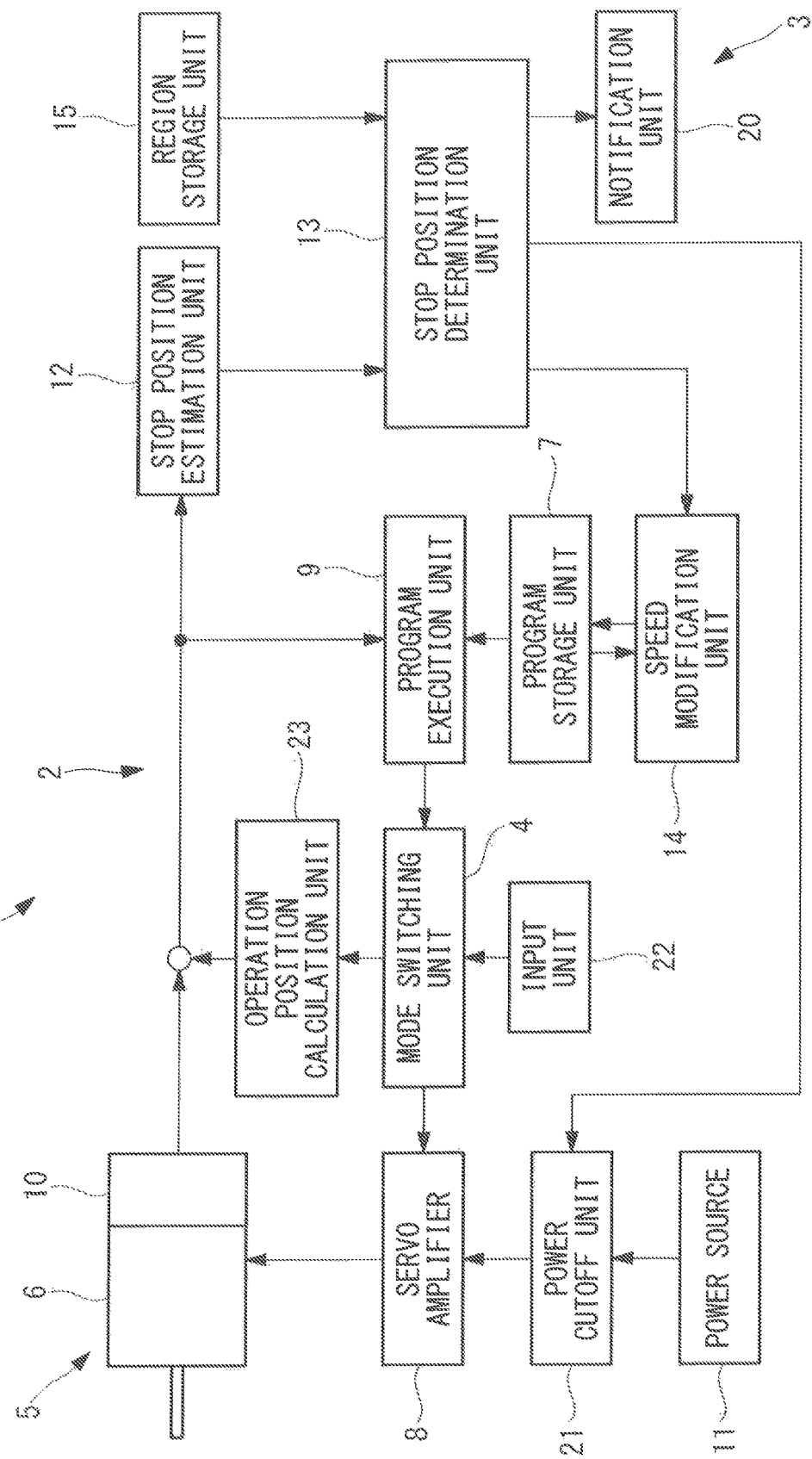
FIG. 4 is a block diagram showing a modified example of the robot control device in FIG. 1.

Moreover, the mode switching unit 4 is described to invalidate the power cutoff unit 21 in the modification mode, but instead, one that switches an output destination of a command signal output from the program execution unit 9 from the servo amplifier 8 to an operation position calculation unit 23 may be adopted, as shown in FIG. 4. The operation position calculation unit 23 simulates operation of the motor 6 of each shaft, and calculates each operation position at the time of program execution.

In the case of the modification mode, a stop position may be estimated and the set speed in the operation program may be modified in a state where the robot 5 is stopped, by the operator stopping input of a command signal from the program execution unit 9 to the servo amplifier 8 and performing switching such that input is performed instead to the operation position calculation unit 23, by using the mode switching unit 4 from the input unit 22.

Moreover, in the present embodiment, the robot control device 1 modifies the set speed while operating the robot 5, but the set speed may be modified while operating offline a three-dimensional model of the robot 5 by a robot simulation device which realizes a model of each structural element shown in FIG. 1 by software and which executes the operation program on a personal computer.

From the above-described embodiment, the following invention is derived.

An aspect of the present invention provides a robot program modification device including a program storage unit that stores an operation program for a robot, a program execution unit that executes the operation program stored in the program storage unit, a stop position estimation unit that estimates, at each operation position of the robot during execution of the operation program by the program execution unit, a stop position of the robot in a case of cutoff of power, based on a movement speed of the robot, a stop position determination unit that determines whether the stop position estimated by the stop position estimation unit is in a predetermined region or not, and a speed modification unit that modifies, in a case where the stop position is determined by the stop position determination unit to be outside the region, a set speed in the operation program such that a movement speed at the operation position corresponding to the stop position is reduced.

According to the present aspect, when the operation program for the robot stored in the program storage unit is executed by the program execution unit, the operation program proceeds to cause each shaft of the robot to operate, based on position coordinates of each teaching point described in the operation program for the robot and a set speed towards a next teaching point. At each operation position of the robot during execution of the operation program, the stop position of the robot in a case of cutoff of power is estimated by the stop position estimation unit based on the movement speed of the robot, and whether the estimated stop position is within the predetermined region is determined by the stop position determination unit.

Then, in a case where the estimated stop position is determined by the stop position determination unit to be outside the predetermined region, the speed modification unit performs modification such that the set speed in the operation program is reduced, and thus, the possibility to be determined by the stop position determination unit to be outside the predetermined region may be reduced when the same position is passed through in the next time. The amount of reduction in the set speed may be arbitrarily set, and when a large amount of reduction is set, the set speed in the operation program may be modified at once such that the stop position will be within the predetermined region. In contrast, when a small amount of reduction is set, modification to the maximum set speed at which the stop position can be caused to be in the predetermined region may be performed by executing the operation program one or more times. Accordingly, the stop position in a case of cutoff of power may be prevented from being positioned outside the predetermined region, without modifying the position coordinates of each teaching point in the operation program.

Another aspect of the present invention provides a robot control device including the robot program modification device described above, an alarm/stop unit that issues an alarm and cuts off power to the robot in a case where the stop position is determined by the stop position determination unit to be outside the region, and a mode switching unit that switches operation of the alarm/stop unit to invalid, at a time of execution of the operation program by the program execution unit for modification of the set speed by the speed modification unit.

According to the present aspect, by executing the operation program in a state where operation of the alarm/stop unit is switched to invalid by the mode switching unit, even when the estimated stop position is determined to be outside the predetermined region, modification is performed such that only the set speed in the operation program corresponding to the corresponding operation position is reduced without issuance of an alarm and cutoff of power being performed. Then, by switching the operation of the alarm/stop unit to valid by the mode switching unit after the operation program is modified, the robot may be caused to move in such a way that the stop position will not be outside the predetermined region even if power is cut off, and also, if the estimated stop position is determined to be outside the predetermined region for some reason, an alarm may be issued and power may be cut off by operation of the alarm/stop unit.

In the aspect described above, the mode switching unit may perform switching such that the operation program is executed in a state where the robot is stopped, at a time of execution of the operation program by the program execution unit for modification of the set speed by the speed modification unit.

Accordingly, in the case of executing the operation program by the program execution unit for modification of the set speed, the set speed in the operation program may be modified such that the stop position will not be outside the predetermined region, without causing the robot to move. This allows the operation program to be modified while reliably preventing interference between the robot and peripheral equipments.

Furthermore, another aspect of the present invention provides a robot simulation device including the robot program modification device described above.

According to the present aspect, the operation program may be executed by using a three-dimensional model of the robot, and the set speed in the operation program corresponding to the operation position for which the estimated stop position is determined to be outside the predetermined region may be modified.

Moreover, another aspect of the present invention provides a robot program modification method including an execution step of executing an operation program for a robot created and stored in advance, a stop position estimation step of estimating, at each operation position of the robot during execution of the operation program in the execution step, a stop position of the robot in a case of cutoff of power, based on a movement speed of the robot, a stop position determination step of determining whether the stop position estimated in the stop position estimation step is in a predetermined region or not, and a speed modification step of modifying, in a case where the stop position is determined in the stop position determination step to be outside the region, a set speed in the operation program such that a movement speed at the operation position corresponding to the stop position is reduced.

REFERENCE SIGNS LIST 1 robot control device
2 robot program modification device
3 alarm/stop unit
4 mode switching unit
5 robot
7 program storage unit
9 program execution unit
12 stop position estimation unit
13 stop position determination unit
14 speed modification unit
S5 execution step
S7 stop position estimation step
S8 stop position determination step
S11 speed modification step

The invention claimed is:

1. A robot control device, wherein the robot control device is configured to:
    store an operation program for a robot;
    execute the stored operation program;
    estimate, at each operation position of the robot during execution of the operation program, a stop position of the robot in a case of cutoff of power, based on a movement speed of the robot;
    determine whether the estimated stop position is in a predetermined region or not; and
    modify, in a case where the stop position is determined to be outside the region, a set speed in the operation program such that a movement speed at the operation position corresponding to the stop position is reduced;
    perform a stop operation in which an alarm is issued and power to the robot is cut off in a case where the stop position is determined to be outside the region; and
    switch the stop operation to invalid at a time of execution of the operation program for modification of the set speed.

2. The robot control device according to claim 1, wherein the robot control device is configured to perform switching such that the operation program is executed in a state where the robot is stopped, at a time of execution of the operation program for modification of the set speed.

3. A robot control method comprising:
    executing an operation program for a robot created and stored in advance;
    estimating, at each operation position of the robot during execution of the operation program, a stop position of the robot in a case of cutoff of power, based on a movement speed of the robot;
    determining whether the estimated stop position is in a predetermined region or not;
    in a case where the stop position is determined to be outside the region, modifying a set speed in the operation program such that a movement speed at the operation position corresponding to the stop position is reduced;
    in a case where the stop position is determined to be outside the region, performing a stop operation in which an alarm is issued and power to the robot is cut off; and
    switching the stop operation to invalid at a time of execution of the operation program for modification of the set speed.

* * * * *